US011223230B2

(12) United States Patent
Sauterel et al.

(10) Patent No.: US 11,223,230 B2
(45) Date of Patent: *Jan. 11, 2022

(54) WIRELESS CHARGING FOR AN INPUT DEVICE

(71) Applicant: Logitech Europe S.A., Lausanne (CH)

(72) Inventors: Fabrice Sauterel, Lausanne (CH); Christopher Pate, San Lorenzo, CA (US); Laurent Plancherel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 121 days.

This patent is subject to a terminal disclaimer.

(21) Appl. No.: 16/823,315

(22) Filed: Mar. 18, 2020

(65) Prior Publication Data

US 2020/0287416 A1 Sep. 10, 2020

Related U.S. Application Data

(63) Continuation of application No. 15/397,570, filed on Jan. 3, 2017, now Pat. No. 10,622,824.

(Continued)

(51) Int. Cl.
*H02J 50/10* (2016.01)
*G06F 3/0354* (2013.01)
(Continued)

(52) U.S. Cl.
CPC .............. *H02J 50/005* (2020.01); *H02J 50/10* (2016.02); *H02J 50/90* (2016.02); *G06F 3/0395* (2013.01); *G06F 3/03543* (2013.01)

(58) Field of Classification Search
CPC ........... H04B 5/0037; B60L 53/12–126; B60L 53/34; B60L 53/38–39; H01F 38/14; G06F 3/033–0395
See application file for complete search history.

(56) References Cited

U.S. PATENT DOCUMENTS 8,055,310 B2  11/2011  Beart et al.
10,622,824 B2  4/2020  Sauterel et al.
(Continued)

FOREIGN PATENT DOCUMENTS

CN  1716174 A  1/2006
CN  101782809 A  7/2010
(Continued)

OTHER PUBLICATIONS

"Product Video", Available Online at https://w\vw.youtube.com/watch?v=rv0105yUrUA, Accessed from Internet on: Nov. 8, 2019, pp. 1-2.

(Continued)

*Primary Examiner* — Hal Kaplan
*Assistant Examiner* — David A Shiao
(74) *Attorney, Agent, or Firm* — Kilpatrick Townsend & Stockton LLP

(57) ABSTRACT

An apparatus including a removable modular insert disposed within a housing of a host device, the housing including one or more magnets, and one or more conductive contacts disposed on the removable modular insert to magnetically couple to the one or more magnets and secure the modular insert within the housing of the host device, and electrically couple the modular insert to the host device. A conductive coil can be coupled to the modular insert to electromagnetically receive power from a base device having a surface, where the host device moves and operates along the surface of the base device. The apparatus can include a communication device and a processor to control the communication device for communication between the modular insert and the host device, and control operation of the conductive coil. The communication device further controls the electromagnetic coupling between the modular insert and the base device.

16 Claims, 13 Drawing Sheets

Related U.S. Application Data

(60) Provisional application No. 62/304,053, filed on Mar. 4, 2016.

(51) Int. Cl.
  *H02J 50/00* (2016.01)
  *H02J 50/90* (2016.01)
  *G06F 3/039* (2013.01)

(56) References Cited

U.S. PATENT DOCUMENTS

| | | |
|---|---|---|
| 2003/0103039 A1 | 6/2003 | Burr et al. |
| 2008/0111518 A1 | 5/2008 | Toya |
| 2008/0311765 A1 | 12/2008 | Chatterjee et al. |
| 2009/0072782 A1 | 3/2009 | Randall |
| 2009/0243396 A1 | 10/2009 | Randall |
| 2009/0311765 A1 | 12/2009 | Maguire et al. |
| 2010/0194334 A1 | 8/2010 | Kirby et al. |
| 2011/0050164 A1 | 3/2011 | Partovi et al. |
| 2013/0043833 A1 | 2/2013 | Katz et al. |
| 2013/0082536 A1 | 4/2013 | Taylor et al. |
| 2013/0200844 A1 | 8/2013 | Lee et al. |
| 2014/0111150 A1 | 4/2014 | Deng |
| 2014/0302782 A1 | 10/2014 | Raab et al. |
| 2014/0375139 A1 | 12/2014 | Tsukamoto |
| 2015/0049833 A1 | 2/2015 | Noguchi et al. |
| 2015/0244425 A1 | 8/2015 | Nakase |
| 2015/0288195 A1 | 10/2015 | Ashery et al. |
| 2016/0085322 A1 | 3/2016 | Park et al. |
| 2016/0197513 A1 | 7/2016 | Uchimoto et al. |
| 2016/0372956 A1 | 12/2016 | Jung et al. |
| 2017/0256977 A1 | 9/2017 | Sauterel et al. |
| 2017/0256978 A1 | 9/2017 | Sauterel et al. |
| 2017/0288462 A1 | 10/2017 | Suzuki |
| 2017/0338685 A1 | 11/2017 | Jung et al. |
| 2019/0140469 A1 | 5/2019 | Lee |

FOREIGN PATENT DOCUMENTS

| | | |
|---|---|---|
| CN | 202260497 U | 5/2012 |
| CN | 103955300 A | 7/2014 |
| CN | 204423325 U | 6/2015 |
| CN | 104881153 A | 9/2015 |
| CN | 107154678 A | 9/2017 |
| CN | 107154679 A | 9/2017 |
| DE | 102017002146 A1 | 9/2017 |
| DE | 102017002147 A1 | 9/2017 |
| JP | 2009518738 A * | 5/2009 |
| KR | 20090128450 A | 12/2009 |

OTHER PUBLICATIONS

"Product Video", Available Online at https://w\vw.youtube.com/watch?v=ZJBeLLjUDaU, Accessed from Internet on: Nov. 8, 2019, pp. 1-2.

"Product Webpage", Available Online at http://direct.sanwa.co.jp/contents/sp/400-MA030/, Accessed from Internet on: Nov. 8, 2019, pp. 1-9.

U.S. Appl. No. 15/397,570 , "Advisory Action", dated Oct. 30, 2019, 4 pages.

U.S. Appl. No. 15/397,570 , "Final Office Action", dated Jul. 10, 2019, 16 pages.

U.S. Appl. No. 15/397,570 , "Non-Final Office Action", dated Jan. 15, 2019, 21 pages.

U.S. Appl. No. 15/397,570 , "Notice of Allowance", dated Dec. 11, 2019, 11 pages.

U.S. Appl. No. 15/397,572 , "Final Office Action", dated Aug. 21, 2019, 14 pages.

U.S. Appl. No. 15/397,572 , "Non-Final Office Action", dated Mar. 20, 2019, 14 pages.

CN201710128337.4 , "Office Action", dated May 4, 2017, 1 page.
CN201710128337.4 , "Office Action", dated May 24, 2021, 12 pages.

* cited by examiner

WIRELESS CHARGING FOR AN INPUT DEVICE

CROSS-REFERENCES TO RELATED APPLICATIONS

This application is a continuation of U.S. Non-Provisional application Ser. No. 15/397,570, filed, Jan. 3, 2017, and titled, WIRELESS CHARGING FOR AN INPUT DEVICE, which claims the benefit and priority of U.S. Provisional Application No. 62/304,053, filed on Mar. 4, 2016, and titled "WIRELESS CHARGING FOR AN INPUT DEVICE," which are hereby incorporated by reference in their entirety for all purposes.

The following regular U.S. patent application was filed concurrently with application Ser. No. 15/397,570, filed, Jan. 3, 2017 and titled, WIRELESS CHARGING FOR AN INPUT DEVICE, and the entire disclosure of the other application is incorporated by reference into this application for all purposes:
  application Ser. No. 15/397,572, filed Jan. 3, 2017, titled "WIRELESS CHARGING FOR AN INPUT DEVICE."

BACKGROUND

Wireless peripheral devices (e.g., computer mice, keyboards, speakers, ear buds, smart wearables, etc.) are widely used and provide portability and convenience, but often suffer from poor battery life. Although battery technology continues to improve, most peripheral devices require a charging cable for extended usage, which can be cumbersome, limiting, and defeats the purpose of wireless technology in general. Some contemporary charging schemes solve this problem by utilize charging base to wirelessly charge a peripheral device over time. These types of charging stations can be helpful, but typically require the peripheral device to remain immobile. For instance, wireless ear buds need to remain on a mantle, or smart phones may need to remain on a charging block. However, these charging applications are ineffective for devices that require constant use and/or movement, such as computer mice. Better methods of wireless charging are needed.

BRIEF SUMMARY

In some embodiments, an apparatus includes a removable modular insert disposed within a housing of a host device. The housing can include one or more magnets. The apparatus can include one or more conductive contacts disposed on the removable modular insert to magnetically couple to the one or more magnets and secure the modular insert within the housing of the host device. The magnets can further electrically couple the modular insert to the host device. A conductive coil can be coupled to the modular insert to electromagnetically receive power from a base device having a surface, where the host moves and operates along the surface of the base device. The base device can be a powered computer mouse pad. A storage device (e.g., battery) can be used to store the received electromagnetic power from the base device.

Certain embodiments further include a communication device and a processor to control the communication device for communication between the modular insert and the computer mouse, and control operation of the conductive coil. The processor can control operation of the communication device and the electromagnetic coupling between the modular insert and the base device. The processor can further control wireless communication between the computer mouse and a computing device that the computer mouse is communicatively paired to. The wireless communication between the base device and modular insert can be based on any suitable communication protocol including, but not limited to, Bluetooth®, Bluetooth LE®, ZigBee®, RF, infra-red, or the like. The modular insert can be any suitable shape. In certain implementations, the modular insert is coin shaped, and when disposed within the housing, is secured in a cavity within the computer mouse (e.g., within a housing).

In further embodiments, a computer mouse includes a housing, a processor disposed in the housing, and a cavity formed in the housing and including one or more magnets, the cavity to receive a removable modular insert disposed within the cavity and controlled by the processor. The modular insert can include one or more conductive contacts to magnetically couple to the one or more magnets and secure the modular insert to the housing of the computer mouse, and the modular insert can electrically couple the modular insert to the computer mouse. The modular insert can include a conductive coil to electromagnetically receive power from a base device having a surface, where the computer mouse moves and operates along the surface of the base device. The modular insert can include a communication device controlled by the processor to communicate with and control operation of the conductive coil. The base device can be a computer mouse pad. The computer mouse can further include a battery, controlled by the processor, to store the electromagnetically received power from the base device.

In some embodiments, a method includes receiving, within a cavity of a computer mouse, a removable modular insert that includes a conductive coil, establishing a communicative coupling with the modular insert, controlling operation of the modular insert via the communicative coupling, and establishing and controlling electromagnetic power coupling between the conductive coil and a base device when the computer mouse is placed in close proximity to the base device. The cavity can include one or more magnets disposed therein. The receiving of the removable modular insert in the cavity can further include magnetically securing the modular insert in the cavity via the one or more magnets. Communicative coupling with the modular insert can include electrical coupling via the one or more magnets. The base device can be a computer mouse pad and the computer mouse can move and operate along a surface of the base device. In some implementations, the computer mouse can have a battery and the method can further include storing power electromagnetically received from the base device in the battery. In some cases, the method may include establishing and controlling communication between the computer mouse and the base device to control the electromagnetic power coupling there between.

In certain embodiments, a base device includes a housing having a surface to support a host device, a processor disposed in the housing, and a wireless receiver controlled by the processor and disposed in the housing to control communication between the base device and the host device. The housing of the base device can be a powered mat and the host device can be a computer mouse. The base device may be in electronic communication with a computing device, and the communication between the base device and the host device can include control signals that originate from the computing device.

In further embodiments, a host device includes a housing, a processor disposed in the housing, and a cavity formed in the housing to receive a removable modular insert disposed within the cavity and controlled by the processor, where the modular insert, when inserted into the cavity, can be electrically coupled to the host device, and where the modular insert includes a power source and a wireless transceiver to wirelessly couple the host device to a corresponding computing device.

In certain embodiments, a method includes receiving a removable module on a docking port of a portable audio speaker, where the module includes a wireless communication device, a conductive coil, and an energy storage device, where the module, when received by the docking port, may be electrically coupled to the portable audio speaker, and where the wireless communication device, the conductive coil, and the energy storage device may be controlled by a processor disposed in the portable audio speaker via the electrical coupling between the module and the portable audio speaker. The method can further include establishing electronic communication between the wireless communication device and a charging device, generating, by the processor, a control command to cause the base device to electromagnetically radiate power when the module is in a proximity to the base device, receiving power electromagnetically received by the conductive coil, and storing the electromagnetically received power in the energy storage device.

BRIEF DESCRIPTION OF THE DRAWINGS

The detailed description is set forth with reference to the accompanying figures.

DETAILED DESCRIPTION

Figure 1:
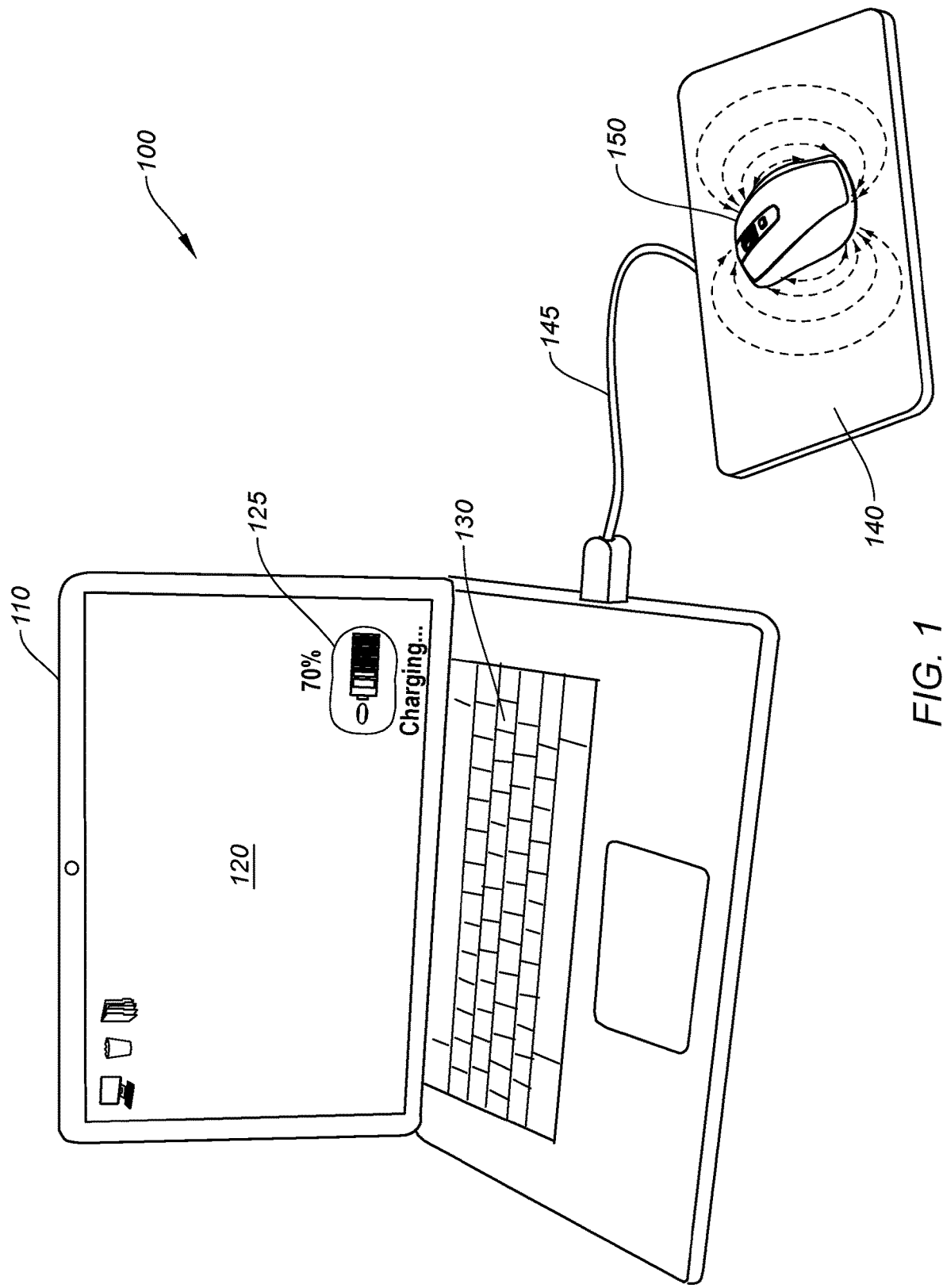
FIG. 1 shows a simplified diagram of a system utilizing a wireless charging system for charging an input device, according to certain embodiments.

The present disclosure relates in general to input devices, and in particular to the wireless charging of input devices.

In the following description, various embodiments of methods and systems for wirelessly charging an input device will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain embodiments of the invention provide a novel method of wirelessly charging a host device (also referred to as an "input device") such as a computer mouse via a charging mat ("base device," "base" or "base station") that also functions as a mouse pad. The base device includes a coil to wirelessly and electromagnetically transfer power to a removable modular insert (also having a coil) disposed in the input device. The base device can provide enough power to the input device for continuous operation without the need of power from an auxiliary power source.

The modular insert can be coin shaped and configured to be inserted into a cavity within a housing of the input device, although other shapes or polygons are possible. In some embodiments, the modular insert can be secured to the input device via magnetic coupling. The magnets can provide both a mechanical mating force and an electrical conduction path to transfer the received power from the base device to the input device (see, e.g., FIG. 4). In some embodiments, the removable modular insert acts as a power receiver for the input device. The modular insert can include additional functionality such as RF capabilities that can be used to convert a corded mouse to a wireless mouse (see, e.g., FIG. 6), or other systems (e.g., processors, accelerometers, sensors, logic, LED control, etc.), to enhance the capabilities of the input device in a modular fashion. Some of these enhancements are discussed below with respect to FIGS. 6-8. Thus, certain embodiments described herein provide a novel modular wireless charging system that can provide myriad customizable functional capabilities in an input device with a convenient and easily installable (and removable) and interchangeable module.

In some embodiments, the base device may continue to wireless emit electromagnetic (EM) power for a threshold time period (e.g., 2 seconds) even when wireless communication between the base device and the input device has been lost. This can be useful when a user is "skating" with a computer mouse by frequently lifting and repositioning during use, which could momentarily break wireless communication between the computer mouse and the base device. Typically, wireless charging systems may cease EM power emission when wireless communication is lost. Certain embodiments may maintain the EM power emission during the threshold time period to see if the connection is reestablished, and further maintain the EM power emission thereafter when reconnection is confirmed (e.g., see FIGS. 11-14).

FIG. 1 shows a simplified diagram of a system 100 for wirelessly charging an input device, according to certain embodiments. System 100 may include a computing device 110 having a display 120 and a keyboard 130. A charging base device 140 is coupled to computing device 110, and an input device 150 is resting on base device 140. Computing device 110 can be a laptop computer, desktop computer, tablet computer, or other suitable computing device. Charging base device 140 can rest on a work surface (e.g., table, desk, etc.) and may be a computer mouse pad or other suitable device with a surface that input device 150 can rest on or move along. Input device 150 can be a computer mouse, remote control, presenter, or other suitable input device that can be configured to work in conjunction with base device 140. Although the embodiments described herein discuss input devices that move along the surface of base device 140, conventionally non-mobile devices can be charged by base device 140 as well, including but not limited to smart phones, smart wearables, ear buds, or any input device configured for wireless charging, as further shown and discussed below with respect to FIGS. 9A-9D. Although the accompanying figures tend to show an input device resting on a base device, it should be understood that the various embodiments can charge the input device (via EM power coupling) while the input device is in use (in motion), which is one of the primary technical advantages of the inventive concepts described herein. Furthermore, "host device" and "input device" can be used interchangeably. The "host device" is so named because it "hosts" or receives a modular insert, as further discussed below.

Base device 140 can include one or more inductive coils and a power supply to generate an EM field. The EM field can be received by input device 150 via its own inductive coil and supporting circuitry (as further discussed below) thereby facilitating the wireless transfer of power from base device 140 to input device 150. Input device 150 may store the received power in a local energy storage device (e.g., battery), power internal circuitry (e.g., processor(s), communication modules, etc.), or a combination thereof. Base device 140 can receive power from computing device 110 via cable 145. In some embodiments, base device 140 may receive power from other sources, including wall sockets, external energy storage devices (e.g., a battery block), or the like. Cable 145 can be of any suitable type (e.g., universal serial bus (USB), FireWire, etc.) and of any suitable length. In some cases, cable 145 may be integrated with other cables (e.g., multi-purpose, multi-standard cable). In further embodiments, base device 140 may include an energy storage system (e.g., multiple internal batteries) to provide wireless power. Base device 140 can function as a computer mouse pad (as shown) and may of any suitable shape or size, and may utilize any number, size, or type of coils for EM emission. In some embodiments, base device 140 may be in a shape other than a pad. For example, base device 140 may be a block or similar object that can emit EM power, where input devices can receive EM power by being within a vicinity of the block (e.g., within 4-5 inches). One of ordinary skill in the art would understand the many variations, modifications, and alternative embodiments thereof. In certain embodiments, system 100 may cause charging status icon 125 to be displayed on display 120 when input device 150 is being charged. Alternatively or additionally, one or more LEDs may light on input device 150 to indicate a charging level, charging state (e.g., charging or not charging), or the like.

Figure 2:
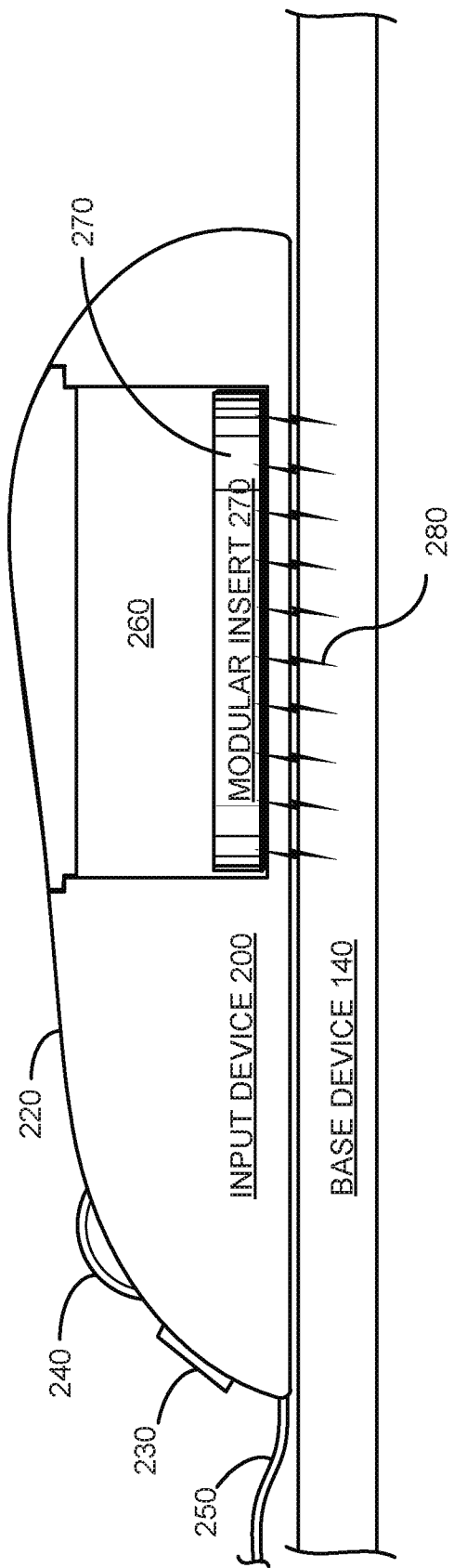
FIG. 2 shows an input device having a cavity disposed therein to receive a removable modular insert, according to certain embodiments.

FIG. 2 shows an input device 200 having a cavity disposed therein to receive a removable modular insert, according to certain embodiments. Input device 200 can be a computer mouse, remote control, a presenter, or other suitable input device. Input device 200 can include one or more processors 210 (not shown), housing 220, button(s) 230, scroll wheel 240, power cable 250 (e.g., USB cable), cavity 260, and removable modular insert 270. Buttons 230, scroll wheel 240, or other conventional functions (e.g., movement tracking, touch detection, etc.) of input device 200 can be controlled by processor(s) 210. Power cable 250 can be any suitable cable (e.g., USB, FireWire, etc.) to electrically and communicatively couple input device 200 to a computing device (e.g., laptop computer, desktop computer, etc.). Modular insert 270 may include an additional processor (not shown), or can be controlled by processor(s) 210. Modular insert 270 can further include one or more inductive coils to electromagnetically receive power from a base device 140, and a communication module to communicate with base device 140 to control the EM coupling process between base device 140 and input device 200 (shown as electromagnetic coupling lines 280). Input device 200 can further include a battery (not shown) to store EM power received from base device 140.

Modular insert 270 can be secured in cavity 260 of input device 200 via magnetic coupling (further discussed below), mechanical coupling (e.g., via pins, screws, tabs), frictional coupling, or the like. Modular insert 270 can be removed and reinserted in cavity 260, removed and inserted in a different input device, and the like. In some embodiments, base device 140 can include a communication device to enable communication between input device 200 and base device 140 (e.g., via a Bluetooth®-based communication protocol), which may include control signals that are passed from input device 200 to base device 140 and on to a corresponding host computing device (e.g., computing device 110).

Figure 3:
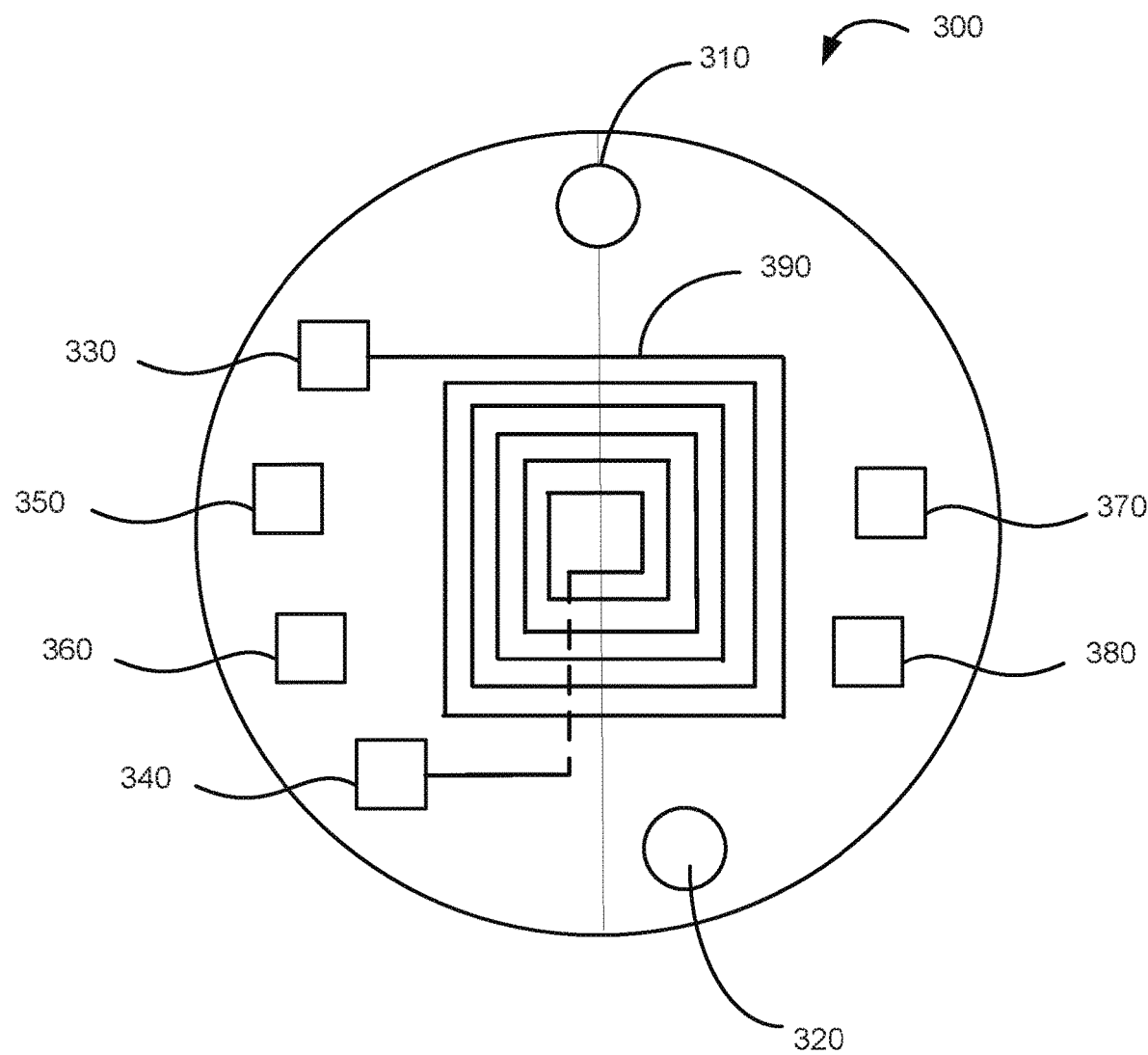
FIG. 3 shows a removable modular insert for an input device, according to certain embodiments.

FIG. 3 shows a removable modular insert ("modular insert") 300 for an input device, according to certain embodiments of the invention. Modular insert 300 can be any suitable shape including disc shaped (as shown), square, rectangular, etc. Modular insert 300 includes ferrite slugs 310, 320, inductive coil contacts 330, 340 coupled to coil 390, processor 350, communication block 360, power management block 370, and energy storage device 380 (e.g., battery). Modular insert 300 can be disposed inside cavity 260 and coupled to housing 220, for example, via magnetic coupling. For instance, ferrite slugs 310, 320 may magnetically and physically couple to a pair of magnets disposed in cavity 260, as shown and described with respect to FIG. 4. Ferrite slugs 310, 320 may be keyed (i.e., offset) to ensure a particular orientation of modular insert 300.

In some embodiments, inductive coil contacts 330, 340 can be coupled to coil 390. Coil 390 can be used to wirelessly (i.e., electromagnetically) receive power from an inductive coil on a base device (e.g., base device 140). FIG. 3 shows contacts 330, 340 to access coil 390, however some embodiments may not include accessible contacts and the operation of coil 390 may be controlled internally (e.g., by on-board processor 350). Coil 390 may be a discrete component (e.g., through-hole or surface mount device) or an integrated device, as shown. Integrated coils may be any suitable size, shape, or location on modular insert 300 as required by design.

Processor 350 can include one or more microprocessors (μCs) and can be configured to control the operation of modular insert 300. In some implementations, processor 350 can also control the operation of input device 200. Alternatively, processor 350 may include one or more microcontrollers (MCUs), digital signal processors (DSPs), or the like, with supporting hardware and/or firmware (e.g., memory, programmable I/Os, etc.), as would be appreciated by one of ordinary skill in the art. Alternatively, MCUs, μCs, DSPs, and the like, may be configured in other system blocks of modular insert 300. For example, communication block 360 may include a local processor to control the various communications described herein (e.g., modular insert-to-base device, input device, or computing device communication). In some embodiments, multiple processors may provide an increased performance in speed and bandwidth. It should be noted that although multiple processors may improve performance in modular insert 300, they are not required for standard operation of the embodiments described herein. In some embodiments, processor 350 may work in conjunction with a processor on its corresponding input device (e.g., input device 200) or may wholly control the operation of input device 200, in addition to the functions local to modular insert 300.

Communication block 360 can be configured to provide wireless communication between modular insert 300 and a host computer (e.g., computing device 110), between modular insert 300 and a base device (e.g., base device 140), between modular insert 300 and the corresponding input device (e.g., input device 200), or a combination thereof, according to certain embodiments. Communications block 360 can be configured to provide radio-frequency (RF), Bluetooth®, Bluetooth LE®, infra-red, ZigBee®, or other suitable communication technology to enable wireless communication. Communication block 360 may optionally include a hardwired connection for bi-directional electronic communication between modular insert 300 and input device 200. Modular insert 300 may optionally comprise a hardwired connection to computing device 110. Some embodiments may utilize different types of cables or connection protocol standards to establish hardwired communication with other entities.

Power management block 370 can be configured to manage power distribution, recharging of an energy storage device, power efficiency, and the like, for modular insert 300 and, in some cases, input device 200. In some embodiments, power management system 370 can include an energy storage device 380, power management devices (e.g., low-dropout voltage regulators—not shown), and a power grid within modular insert 300 to provide power to each subsystem in modular insert 300 and/or input device 200 (e.g., processor 350, communications block 360, etc.). In some cases, the functions provided by power management system 370 may be incorporated in processor 360.

Energy storage device 380 can store power wirelessly received from the base device. In some embodiments, an energy storage device (i.e., battery) of an associated input device (e.g., input device 200) may replace or work in conjunction with energy storage device 380. Energy storage device 380 can be any suitable replaceable and/or rechargeable energy storage device including a lithium polymer battery, NiMH, NiCd, or the like.

Although certain necessary systems may not be expressly discussed, they should be considered as part of modular insert 300, as would be understood by one of ordinary skill in the art. For example, modular insert 300 may include a bus system to transfer power and/or data to and from the different systems therein. In some embodiments, modular insert 300 may include a memory subsystem (not shown). A memory subsystem can store one or more software programs to be executed by processors (e.g., processor 350). It should be understood that "software" can refer to sequences of instructions that, when executed by processing unit(s) (e.g., processors, processing devices, etc.), cause modular insert 300 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations as described herein.

Coupling the Modular Insert to the Input Device

A removable modular insert can be coupled to an input device in a number of ways, such as screws, fasteners, spring clips or other semi-permanent or temporary mechanical means. Certain embodiments of the invention employ a magnetic coupling scheme that combines electrical contacts with mechanical mating force in a simple assembly that self-aligns and snaps in place for a quick, simple, and robust coupling process.

Figure 4:
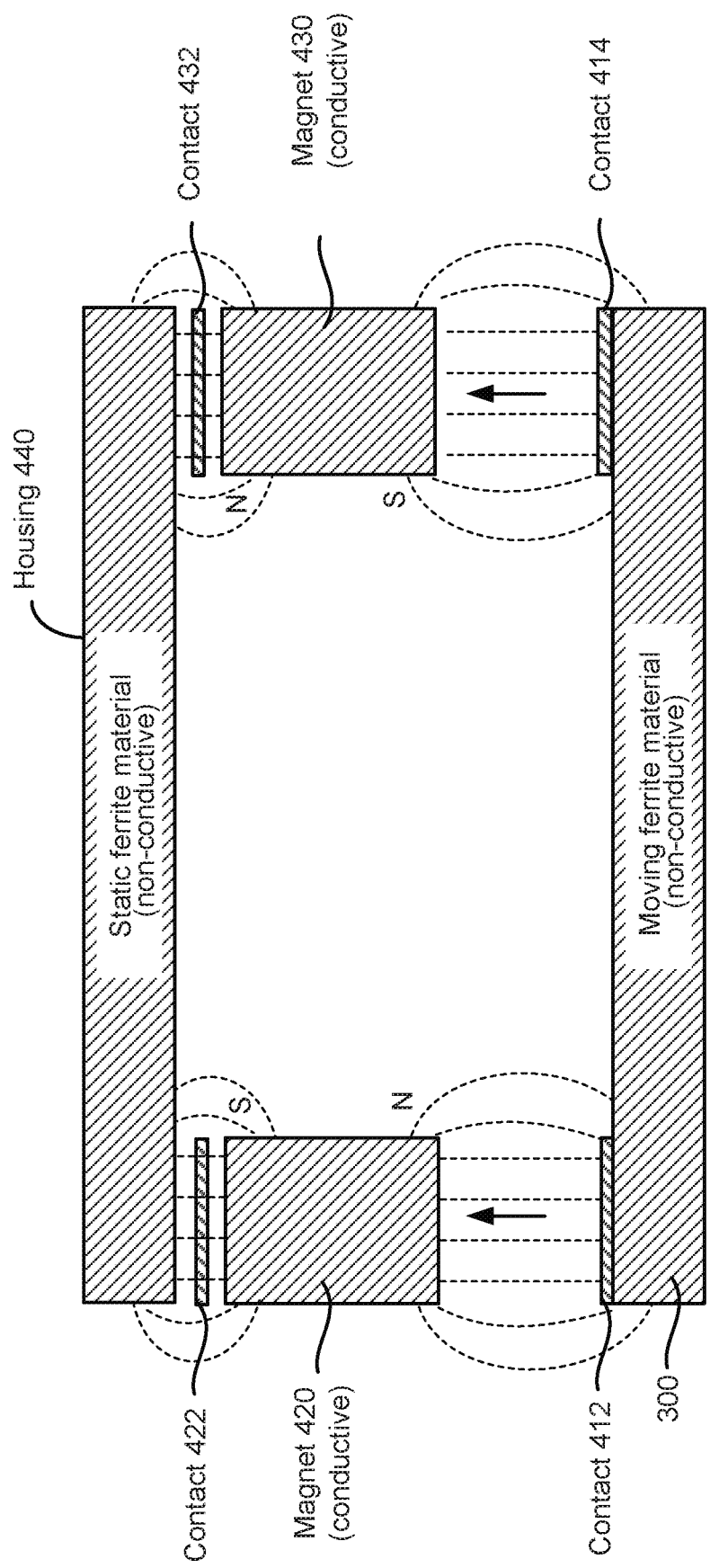
FIG. 4 shows a removable modular insert coupled to an input device, according to certain embodiments.

FIG. 4 shows a removable modular insert 300 coupled to housing 440 of input device 200 via magnetic coupling, according to certain embodiments. Housing 440 can be contained within input device 200 (e.g., in cavity 260). Modular insert 300 includes electrical contacts 412 and 414, which can be coupled to the main body of modular insert 300. Modular insert 300 can be comprised of a non-conductive ferrite material. Contacts 412, 414 can be comprised of any suitable magnetic conductive material (e.g., iron) or thin conductive layer (e.g., flex PCB), and can be shaped, e.g., like a washer (i.e., thin and disc shaped), or other suitable shape, to minimize the gap in the magnetic circuit to bring an electrical connection to the magnets. Housing 440 can be part of input device 200, and in particular can be located in cavity 260. Housing 440 can include electrical contacts 422 and 432 coupled to housing 440, and magnets 420 and 430 coupled to contacts 422, 432. Housing 440 can be comprised of a non-conductive ferrite material. The ferrite portions of modular insert 300 and housing 440 are non-conductive such that the magnetic circuit is closed when both assemblies are coupled together, thus having a strong mating force. Other materials can be used in housing 400 and/or modular insert 300, provided that electrical contacts 412, 414 and 422, 432 are insulated on at least one side. In some embodiments, an additional magnet or set of magnets can be included in modular insert 300 that can provide an orientation force for the coupling process (e.g., similar polarity opposes a mechanical/electrical connection, while opposing polarities causes a mechanical/electrical connection). Magnets can also be used to help align and mate other electrical connections (e.g., communication block 360, power management block 370, etc., as shown in FIG. 3).

Using magnets to magnetically and electrically couple modular insert 300 to housing 400 (and input device 200) can provide several advantages over semi-permanent installations using hardware (e.g., screws, pins, tabs, etc.), adhesive, or the like. For instance, magnetic coupling can provide a strong and self-contained coupling force that avoids device warping, bending, or deformation in the housing or input device. Even small warping deformations of the housing can subtly alter performance characteristics of input device 200, particularly in input devices like gaming computer mice where users typically have very high and exacting expectations in device performance, sensitivity, and precision. Some implementations may utilize a hybrid approach with both magnetic coupling and some hardware based coupling scheme (e.g., clips, screws, tabs, etc.). The magnets may be hidden from view during normal operation and provide aesthetic as well as functional benefits. For instance, users may appreciate the immediate auto-orientation and "snap in" coupling process in embodiments that incorporate magnetic coupling schemes.

Magnets can have a very low electrical resistance and may not present a significant voltage drop in their corresponding circuits. In one experiment, eight magnets were stacked with standard iron washers on each end with electrical probes coupled thereto. With 1 A of current, the eight magnets had a 250 mV voltage drop. With 100 mA, the eight magnets had a 33 mV voltage drop. The voltage drop (and thus resistivity) typically depends primarily on the number of interfaces within the circuit and contacts at the microscopic level, but remains low making magnets at least suitable to carry low currents (e.g., 100 mA to 1 A). Many of the embodiments depicted herein include one or two magnets, such that the electrical characteristics of eight stacked magnets merely exemplify their excellent electrical characteristics, even in non-ideal configurations (i.e., many magnets). Heat dissipation for the magnets can be negligible, even at currents around 1 A, such that heat is typically not a factor in the operation of the embodiments anticipated and/or described herein.

Embodiment 1—Standard Mouse with Wireless Power Receiver

Figure 5:
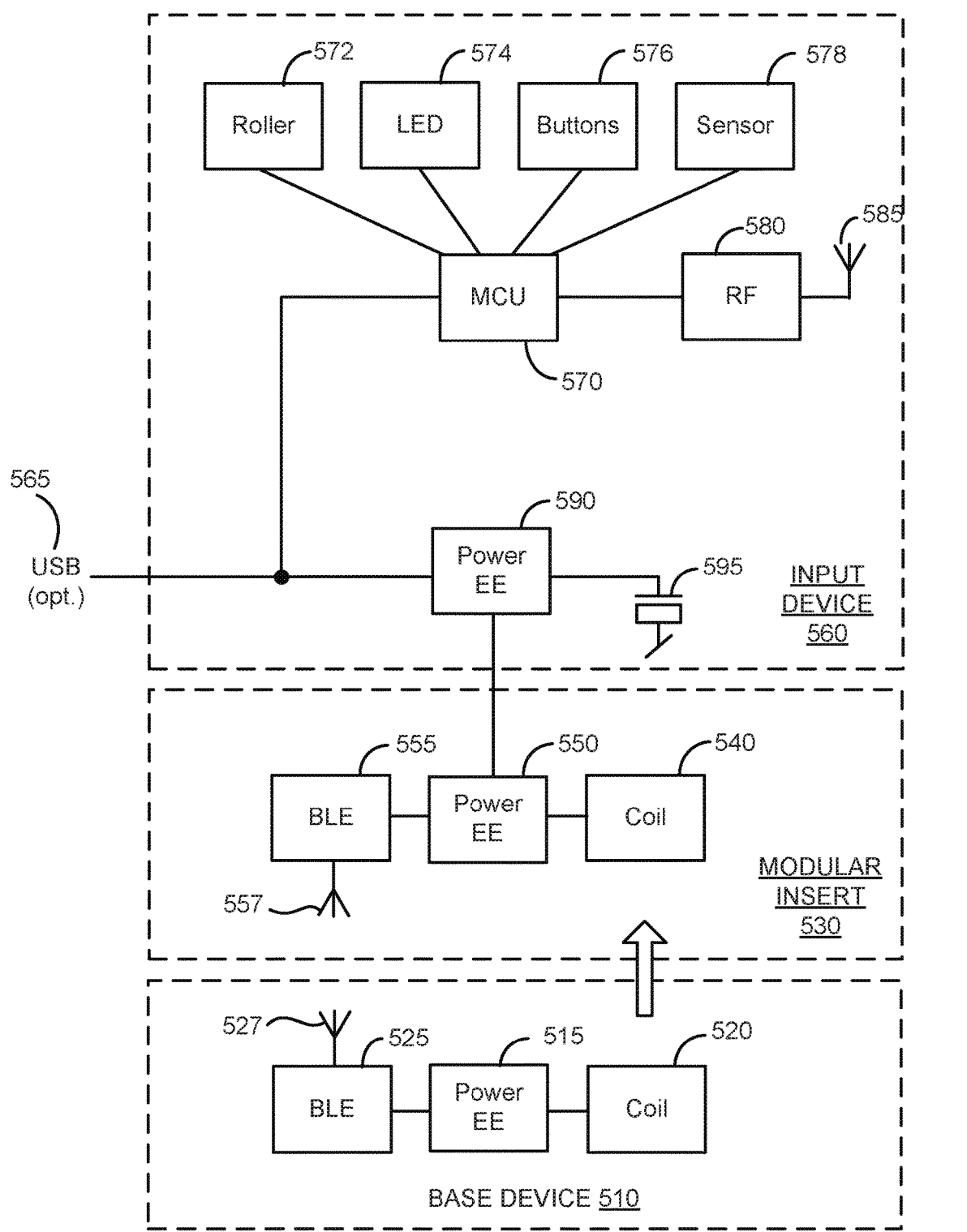
FIG. 5 shows a block diagram of a system for wirelessly charging an input device, according to certain embodiments.

FIG. 5 shows a block diagram of a system 500 for wirelessly charging an input device, according to certain embodiments. In this example, input device 560 is a wireless computer mouse that supports USB communication and RF communication and embeds its own internal battery (not shown) and power management system. System 500 includes a modular insert 530 (e.g., coin shaped insert) that receives power from a corresponding base device (e.g., powered mouse pad). An internal battery (not shown) can be charged via wireless charging through electromagnetic power coupling provided by modular insert 530 and received from base device 510, or via a tethered USB port. Thus, system 500 can provide enough continuous power such that the internal battery can always remain charged while in use and the external hardwired USB charging is not required.

System 500 can include a base device 510, a modular insert 530 and an input device 560. Base device 510 can include inductive coil 520, coupling control block 515, and communication block 525. Coupling control block may include one or more processors. In some embodiments, base device 510 can be similar to base device 140 of FIGS. 1 and 2. Inductive coil 520 may generate and couple electromagnetic power to inductive coil 540 of modular insert 530, as shown in FIGS. 1-2 and further discussed below. Communication block 525 may control communication between base device 510 and modular insert 530 to control, for example, the electromagnetic power coupling process. Communication device 525 can include antenna 527 and can use any suitable communication protocol including, but not limited to, radio-frequency (RF), Bluetooth®, Bluetooth LE®, infra-red, ZigBee®, or other suitable communication technology to enable wireless communication. Coupling control block 515 can control electromagnetic power generation and the operation of the inductive coil and communication block 525. Coupling control block 515 may be any suitable type of processor, as discussed above with respect to processor 350 of FIG. 3.

Input device 560 can include processor(s) 570, roller control block 572, LED control block 574, button control block 576, sensor control block 578, communication block 580, power coupling control block 590, and rechargeable battery 595. In some embodiments, input device 560 is a computer mouse. Rechargeable battery 595 can be any suitable energy buffer (e.g., energy storage device, super cap, etc.). Processor 570 can control the standard operational features of the computer mouse including roller 572 (e.g., scroll wheel), LED control block 574, button control block 576, and sensors (e.g., touch sensors) 578, and the like. Communication control block 580 including antenna 585 can employ any suitable communication protocol including, but not limited to, radio-frequency (RF), Bluetooth®, Bluetooth LE®, infra-red, ZigBee®, or other suitable communication technology to enable wireless communication between input device 560 and an associated host computing device (e.g., laptop computer, desktop computer, tablet computer, etc.). Coupling control block 590 can control communication and power management/transfer between modular insert 530 to input device 560, and may include any suitable type of processor, as discussed above with respect to processor 350 of FIG. 3. USB port 565 can provide power to input device 560 and/or control communication between input device 560 and an associated host computing device.

Modular insert 530 can include a coupling control block 550, a communication block 555 and an inductive coil 540. Coupling control block 550 may control power management and communication between base device 510 and modular insert 530 to control, for example, the electromagnetic power coupling process (e.g., coupling control block may be responsible for communication with base device 510 to indicate that input device 560 (and modular insert 530) is ready to receive electromagnetic power from base device 510. Communication device 525 can include antenna 557 and can use any suitable communication protocol including, but not limited to, radio-frequency (RF), Bluetooth®, Bluetooth LE®, infra-red, ZigBee®, or other suitable communication technology to enable wireless communication. Coupling control block 550 can control electromagnetic power generation and the operation of the inductive coil and communication block 525. Coupling control block 515 may be any suitable type of processor, as discussed above with respect to processor 350 of FIG. 3.

In some embodiments, coupling control block 515 can control EM power emission based on a number of factors. In some cases, control coupling block 515 may cause base device to always emit EM power. Coupling control block 515 may control EM power emission based on whether an input device is on (e.g., resting or moving) base device 510. Such embodiments may include one or more pressure sensors, image sensors, or the like, that can detect when input device 560 is contacting a surface of base device 510. In some cases, coupling control block 515 may cease EM emission when communication with modular insert 530 or input device 560 is lost. Alternatively or additionally, coupling control block 515 may continue EM emission for a period of timing (e.g., 2 seconds) to accommodate for "skating" or similar use cases, as further discussed below with respect to FIGS. 11-15. In certain embodiments, coupling control block 515 may modulate an amount of EM emission based on an energy state of an energy storage device on modular insert 530 and/or input device 560. For instance, when the energy state is low, EM emission may be set to a maximum value. When the energy state is relatively high, EM emission may be reduced or shut down for improved power efficiency. One of ordinary skill in the art would understand the many variations, modifications, and alternative embodiments thereof.

Embodiment 2—Corded to Wireless Mouse Conversion with Wireless Power Receiver

Figure 6:
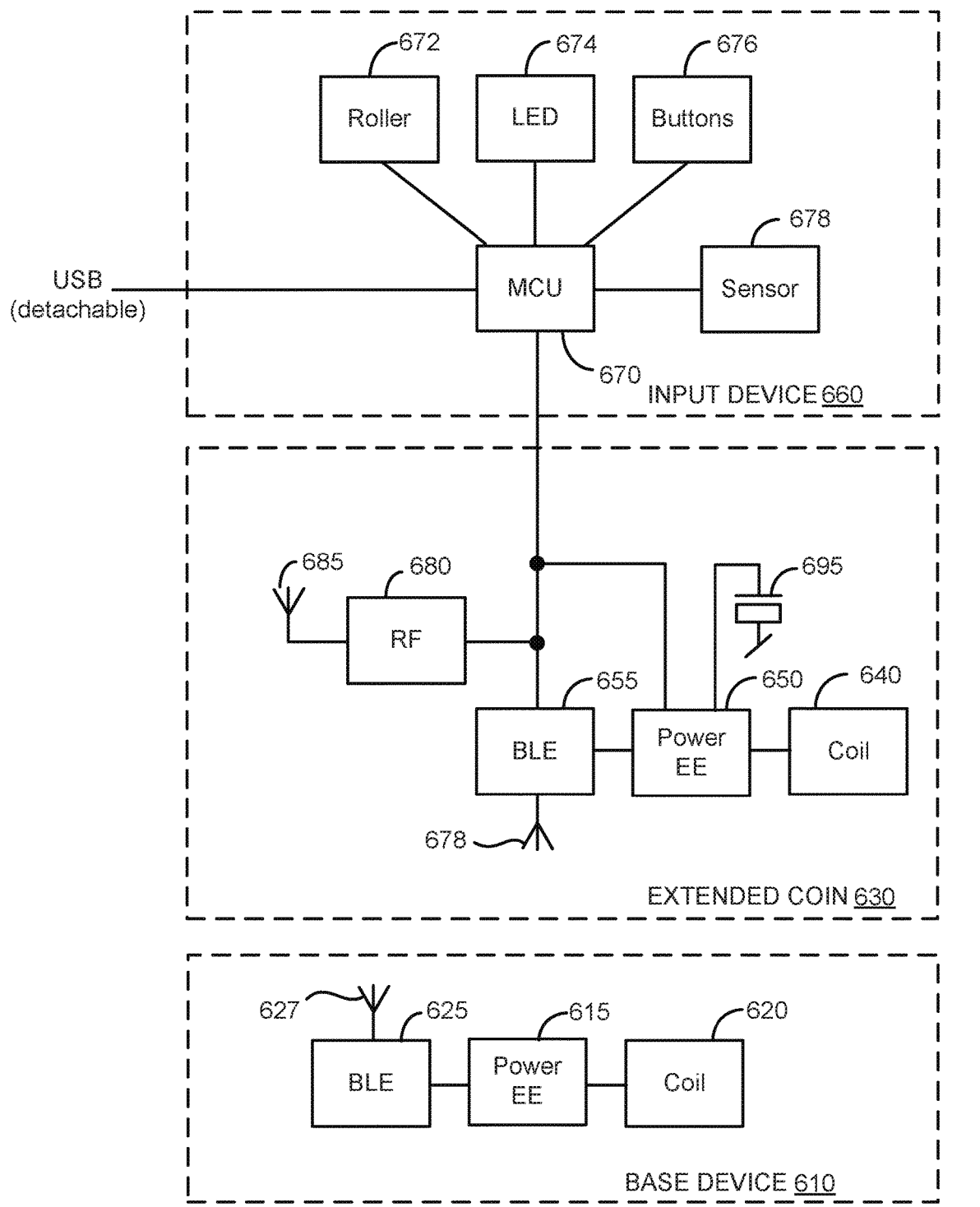
FIG. 6 shows a block diagram of a system for wirelessly charging an input device, according to certain embodiments.

FIG. 6 shows a block diagram of a system 600 for wirelessly charging an input device, according to certain embodiments of the invention. System 600 is similar to system 500, but more of the input device functions are moved to the modular insert including RF communications, a storage device (embedded battery), and power management. System 600 includes a tethered (corded) mouse with no embedded battery and a basic power management scheme. System 600 can be used to transform a corded mouse into a wireless mouse with wireless charging capabilities.

Embodiment 3—Using BLE on Modular Insert for Conventional Mouse Functions

Figure 7:
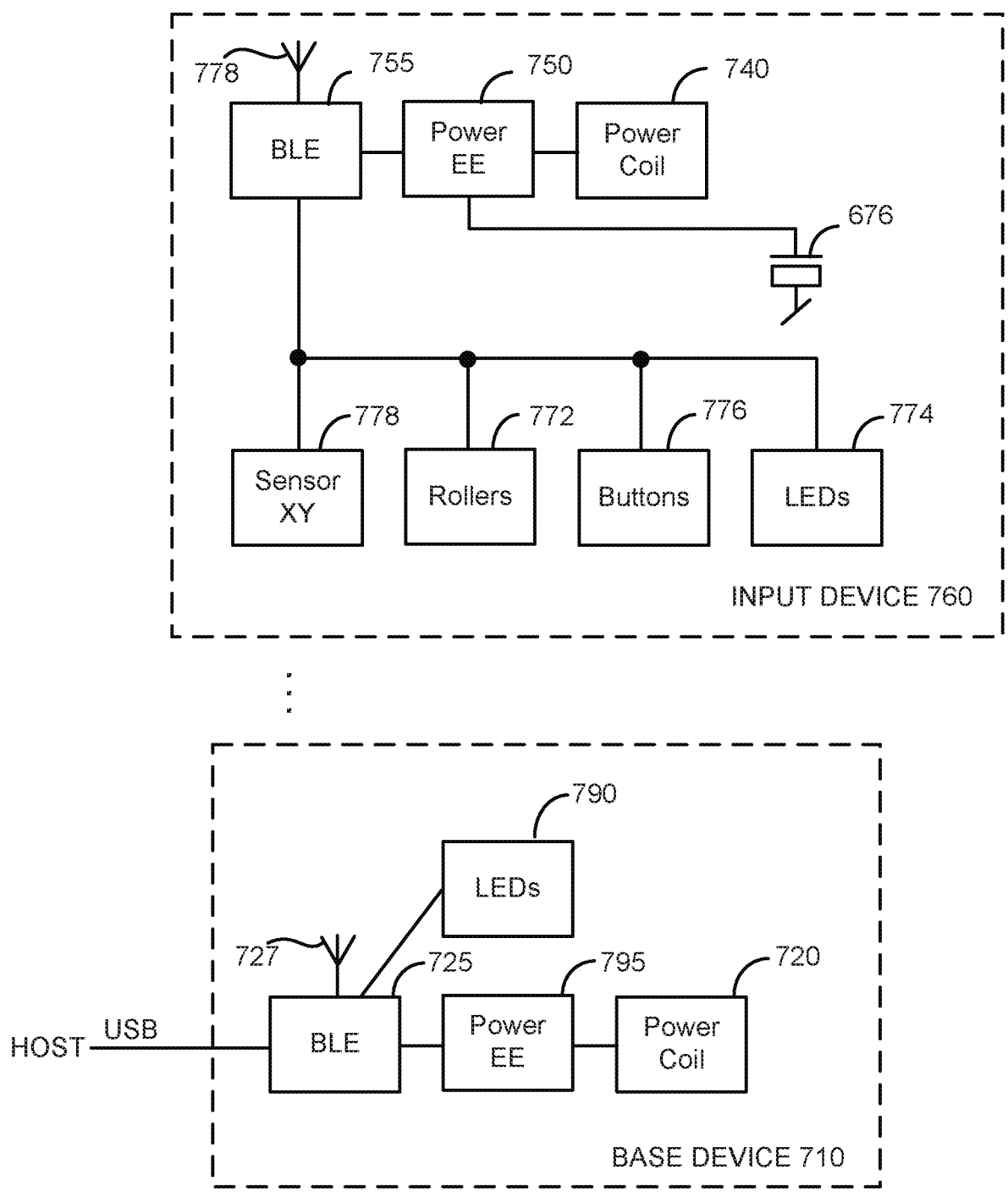
FIG. 7 shows a block diagram of a system for wirelessly charging an input device, according to certain embodiments.

FIG. 7 shows a block diagram of a system 700 for wirelessly charging an input device, according to certain embodiments of the invention. System 700 includes base device 710 and input device 760 (including a modular insert) and may include similar functions as systems 500 and 600. BLE-based communication systems 755 and 725 are typically used to communicate between pad and device. System 700 uses a local processor for pad/device handshaking, as well as other functions like roller, button, X-Y motion/detection, LED control, MEMS, accelerometers, gyroscopes, optical sensors, and the like, and could transmit specific reports with the highest priority (e.g., BLE can generate about 90 rep/s), which is sufficient for typical desktop mice. Base device 710 may receive power from a host computing device (not shown) via USB. The power received from the host via USB can be used to power coil 720 to enable wireless power coupling between base device 710 and input device 760. Some advantages of such system configurations include the following: (1) having one RF link between input device and base device (mouse pad) can reduce the risk of RF jam; (2) the receiver function for base device 710 can remain close to the emitter function (input device), thus optimizing RF link robustness; and (3) in some embodiments, input device 760 does not require a receiver dongle, and a local battery used as a buffer can be significantly reduced or replaced by a capacitor (e.g., super cap), which can advantageously reduce the overall weight of the input device.

Figure 8:
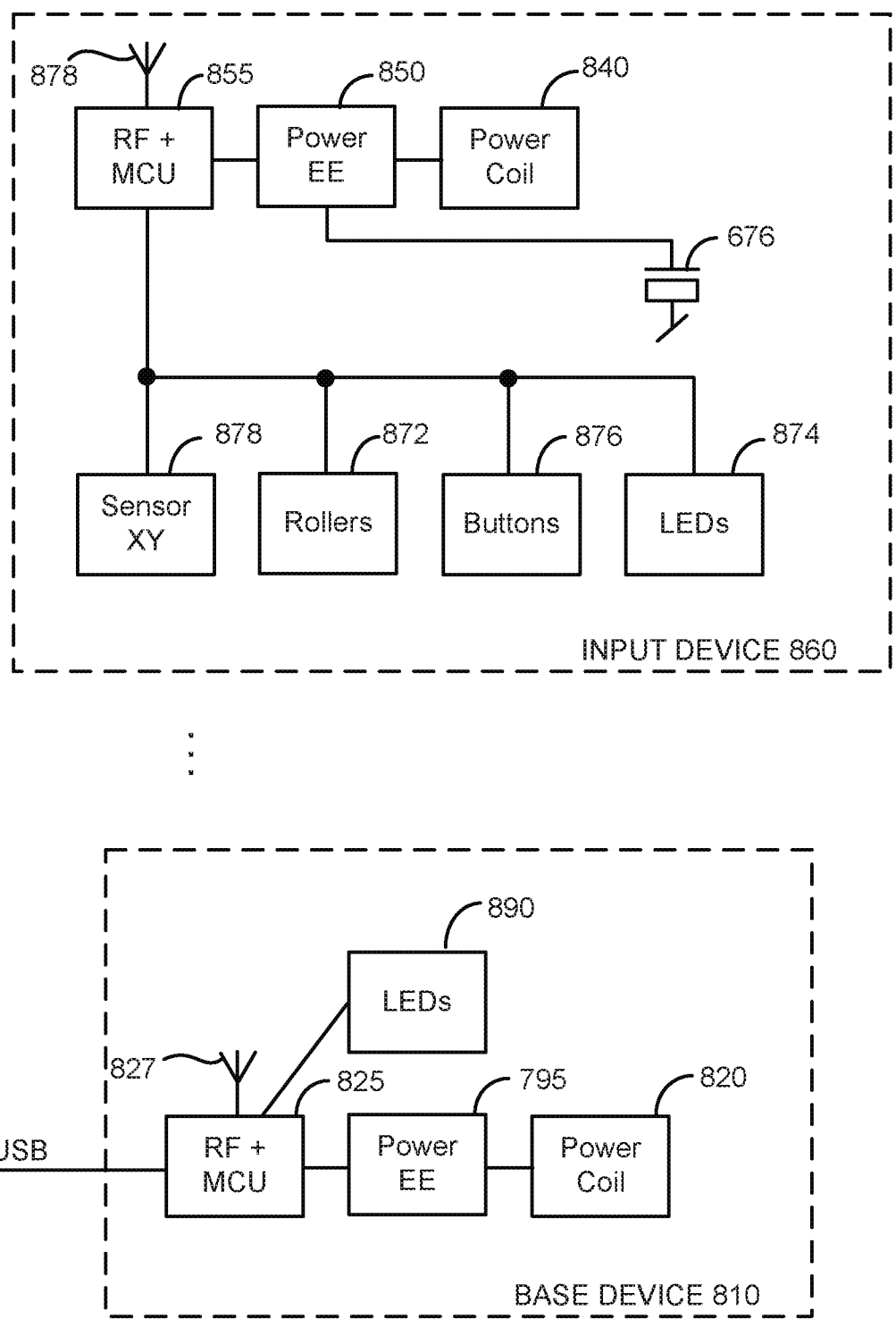
FIG. 8 shows a block diagram of a system for wirelessly charging an input device, according to certain embodiments.

Embodiment 4—Proprietary Communication Protocol to Carry Both Input Device Reports and Input Device/Base Device Handshaking FIG. 8 shows a block diagram of a system 800 for wirelessly charging an input device, according to certain embodiments of the invention. System 800 is similar to system 700 except that the wireless communication between input device 860 and a corresponding computing device (not shown), and the handshaking between the modular insert and base device can be performed by a different communication protocol (e.g., proprietary Logitech® wireless communication protocol) with a high reporting rate which can also reduce report latency and jitter as compared to BLE.

Many of the embodiments described herein are directed to the wireless charging of a computer mouse on a powered base device, as depicted and described above with respect to FIGS. 1-8. However, embodiments of the claimed invention are not limited to such implementations.

Figure 9A:
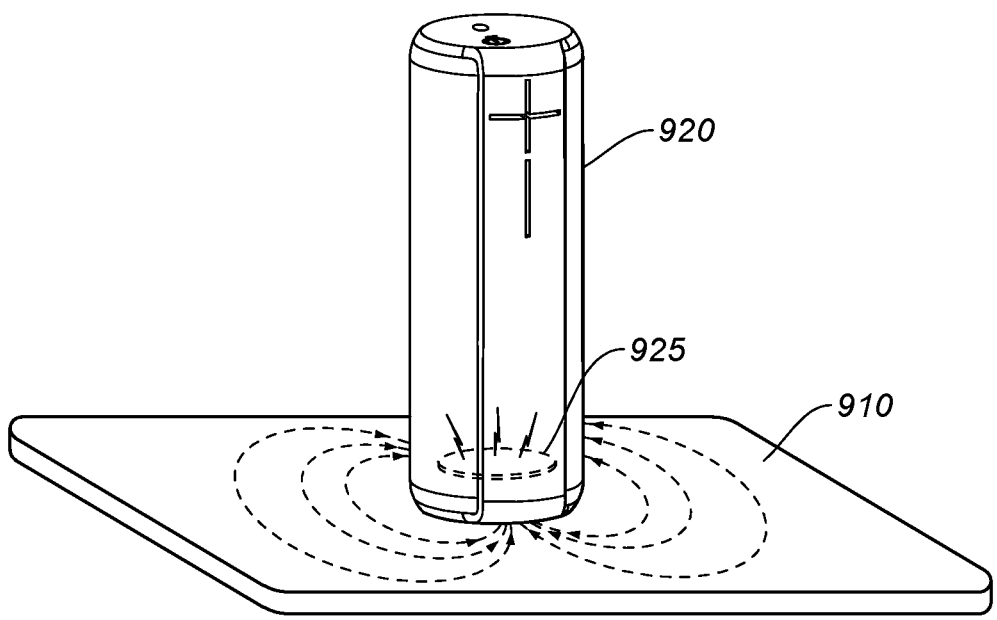
FIG. 9A shows a simplified diagram of a system for wirelessly charging a speaker, according to certain embodiments.
Figure 9B:
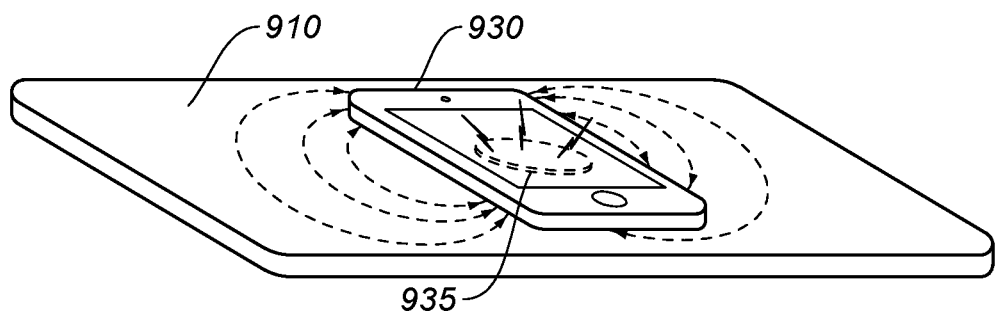
FIG. 9B shows a simplified diagram of a system for wirelessly charging a smart phone, according to certain embodiments.
Figure 9C:
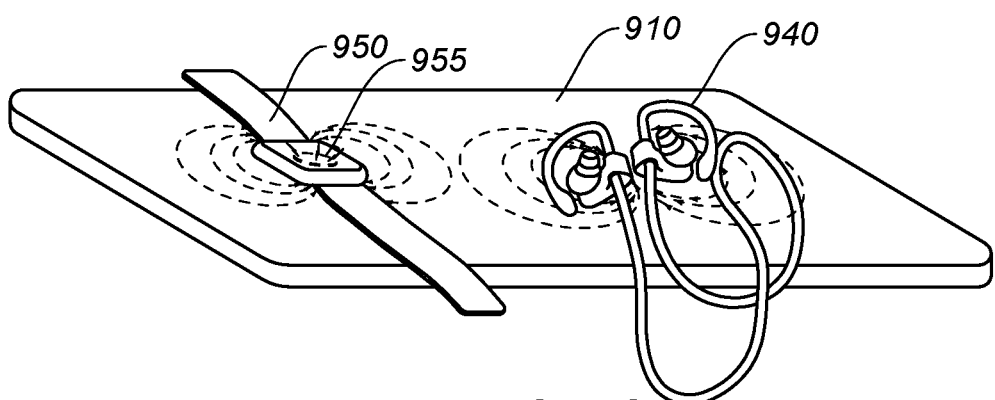
FIG. 9C shows a simplified diagram of a system for wirelessly charging wireless earbuds and a smart watch, according to certain embodiments.

FIG. 9A shows a simplified diagram of a system for wirelessly charging a speaker, according to certain embodiments. System 900 includes host device 920, base device 910, and modular insert 925. In some embodiments, host device 920 can be a speaker and base device 910 can be a charging pad that the speaker rests on. Modular insert 925 can be disposed inside host device 920 or connected externally (e.g., attached to the bottom of speaker 910 and coupled through an I/O port). When host device 920 is placed on or near base device 910, modular insert 930 can communicatively couple to base device 910 via any suitable wireless communication protocol (e.g., Bluetooth®, BLE, etc.). Furthermore, when host device 920 is placed on or near base device 910, host device 920 can begin charging, similar to the embodiments discussed above with respect to FIGS. 1-8. In some implementations, if host device 920 (speaker) is already wirelessly connected to another device (e.g., a mobile smart phone), host device 920 can switch its wireless connection from the other device to base device 920 when, e.g., modular insert 930 determines that it is within a certain proximity to base device 920. Base device 920 may have a wired connection to a computer, or a wireless connection to a network (e.g., the "cloud"). Other host devices can be charged by base device 910 including, but not limited to, smart phones (e.g., see FIG. 9B with phone 930 and modular insert 935), smart watches (e.g., see FIG. 9C with watch 950 and modular insert 955), game controllers, remote controls, microphones, wireless ear buds (e.g., see FIG. 9C with ear buds 940), and the like.

Figure 10:
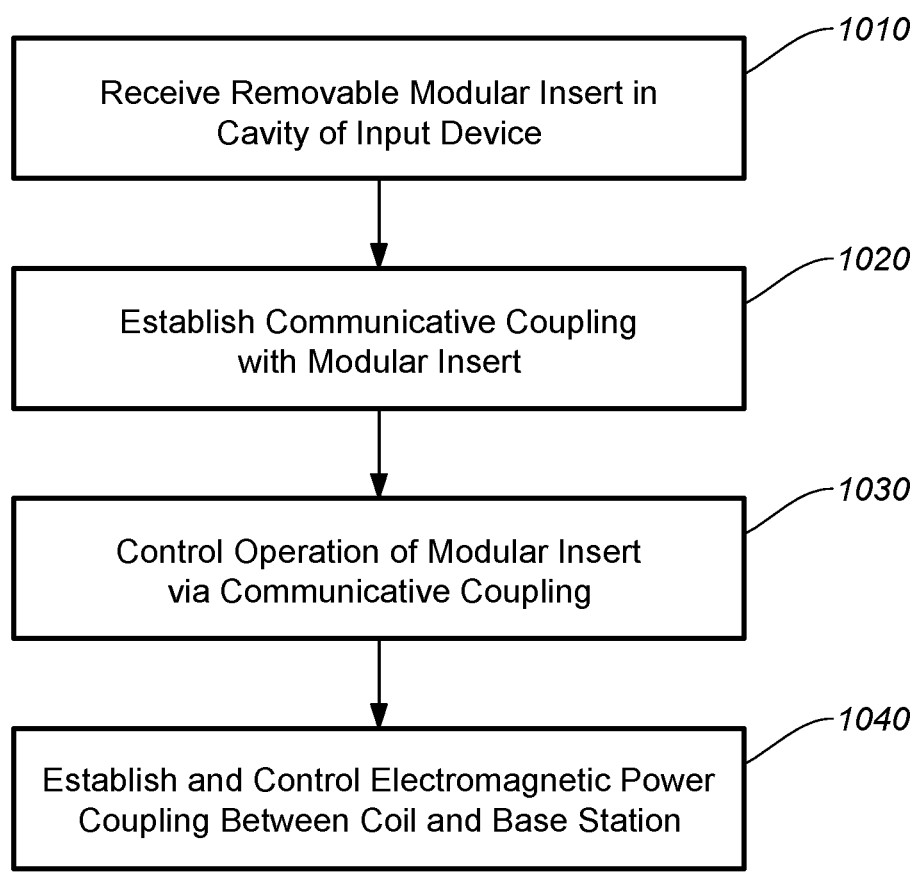
FIG. 10 is a flow chart showing a method of configuring an input device for wireless charging, according to certain embodiments.

FIG. 10 is a flow chart showing a method 1000 of configuring an input device for wireless charging, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by processor 570 of system 500, as shown and described above with respect to FIG. 5.

At step 1010, method 1000 can include receiving a removable modular insert 530 in a cavity of input device 560, according to certain embodiments. Modular insert 530 can be inserted and held in position magnetically, mechanically (e.g., via hardware), by friction, or the like, as further discussed above with respect to FIGS. 2 and 4. When inserted, modular insert 530 can be electrically coupled to input device 560, as shown in FIG. 5 (e.g., coupling control blocks (e.g., processors) 550 and 590 are electrically coupled together). Once electrically connected, EM power received via coil 540 is used to power one or more modules of input device 560. For instance, EM power received by coil 540 can be used to power some or all blocks 572, 574, 576, 578, 580, and 590.

At step 1020, method 1000 can include input device 560 establishing communication with modular insert 530, according to certain embodiments. Communication can be made via hardwired connection (e.g., via wires, hardware, magnets, as described above with respect to FIG. 4, or the like), or via any suitable wireless communication protocol (e.g., BLE). Communication between input device 560 and modular insert 530 may allow input device 560 and modular insert 530 to share resources and allow coupling control block (e.g., processor) 590 to control modular insert 530 (e.g., route received EM power, turn on/off functions of modular insert 530, etc.), or the like (step 1030).

At step 1040, method 1000 can include establishing and controlling electromagnetic power coupling between the conductive coil and a base device when the host device (e.g., input device) is placed in close proximity to the base device, according to certain embodiments. In some cases, EM power coupling may occur when the host device is close enough to maintain a communicative connection with the base device (e.g., BLE) to indicate to the base device that the host device is available to receive EM power.

It should be appreciated that the specific steps illustrated in FIG. 10 provide a particular method 1000 for establishing a wireless connection with a mobile input device, according to certain embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 1000.

Efficient EM Power Emission

Many of the embodiments discussed herein are directed to the wireless transfer of electromagnetic power from a base device (e.g., powered mouse pad) to an input device (e.g., computer mouse). Unlike many wireless charging systems (e.g., smart phone or ear bud docking stations), a user's hand may remain on the charging base device for extended periods of time. In an effort to limit unnecessary exposure to EM radiation, some embodiments may be configured cease or reduce EM emissions when a battery on the input device is determined to be sufficiently charged (e.g., 90% charged). In such cases, the input device and/or modular insert may communicate its current charge state to the base device). Some embodiments may avoid EM emission unless an input device is on the base device. For example, some implementations may employ sensors to detect whether a user is using the input device via pressure sensors and/or image sensors to detect a user's hand and, in the instance where the user is not currently using the input device (e.g., no input device on base device), some embodiments may cease EM emissions.

In certain embodiments, some systems (e.g., system 500) may cause a base device to emit EM power when communication between the base device and input device and/or modular insert is established. When communication is lost, base device may cease EM power emission. This can help improve power efficiency, as the base device may only emit EM power when the input device is known to be within range to receive the EM power. However, communication may be unintentionally lost during normal operation of an input device (e.g., computer mouse) when the user repeatedly moves the input device to the edge of the base device (e.g., powered mouse pad), lifts the input device, and repositions the input device toward the center of the base device, in an action known as "skating." In some embodiments, communication range may be very short (e.g., for low power and efficiency) such that far corners of the base device or locations above the base device beyond a certain distance (e.g., 1 inch, 2 cm, etc.) may not have within range, causing communication to be momentarily lost. When the input device repeatedly loses and reestablishes a communicative connection, it may take time for EM power coupling to be reestablished, which can detrimentally affect charging efficiency. The embodiments described below with respect to FIGS. 11A-15 illustrate aspects of maintaining EM power emission during brief periods of no communicative connectivity (e.g., 2 seconds) to accommodate "skating" and other actions that may affect continuous EM power emission.

Figure 11A:
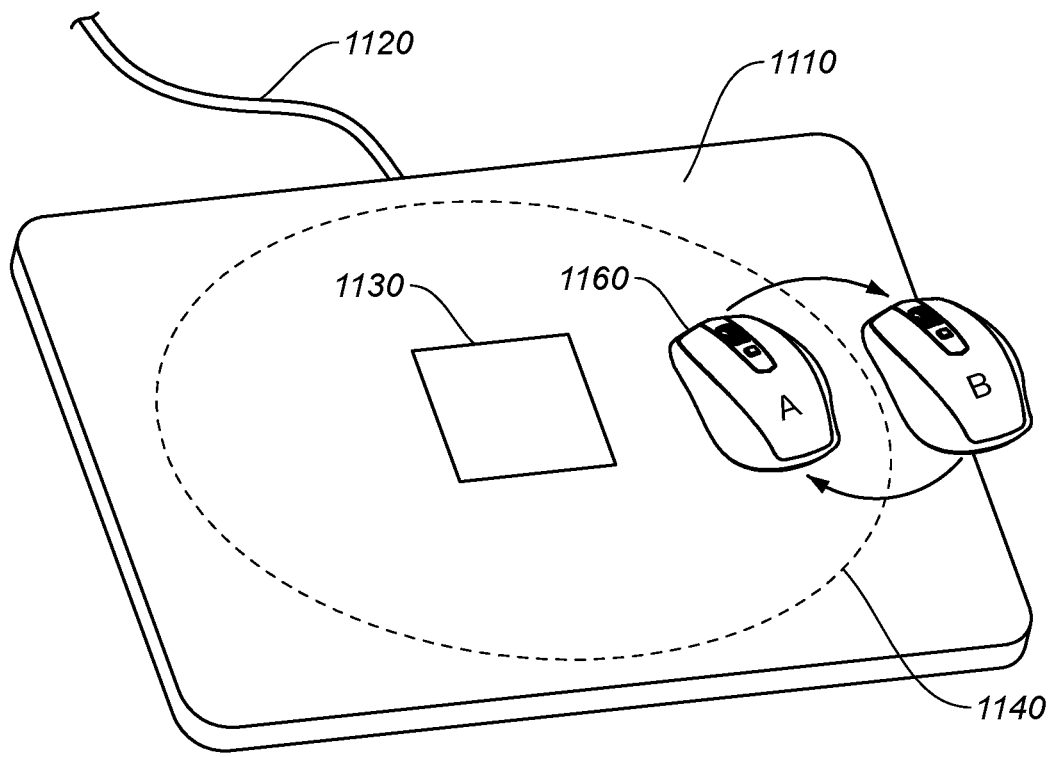
FIG. 11A shows aspects of charging an input device on a base device when the input device is out of communicative range, according to certain embodiments.
Figure 11B:
FIG. 11B shows aspects of charging an input device on a base device when the input device is out of communicative range, according to certain embodiments.

FIG. 11A shows aspects of charging input device 1160 on base device 1110 when input device 1160 is out of communicative range, according to certain embodiments. FIG. 11A includes base device 1110, a power cable 1120, an inductive coil and antenna module 1130, and input device 1160. Inductive coil and antenna module 1130 is shown as a single modular unit, however some embodiments may have separate packaging or multiple instances (e.g., multiple coils and/or antennas disposed within base device 1110 at different locations). In some embodiments, a communicative range for base device 1110 may not have communicative range to its surface edges, as represented by range 1140. Similarly, range may not extend far above base device 1110 (e.g., 1 inch), as shown by range 1150 of FIG. 11B. Input device 1160 is shown to be "skating" from point A to B, where a user repeatedly moves input device 1160 to the edge and repositions on base device 1110, as described above. At position B, input device 1160 may be out of communicative range. Instead of ceasing EM power emission by base device 1110, it may wait for a brief period of time (e.g., 2 seconds) to see if the input device reestablishes communication, as further discussed below.

Figure 12:
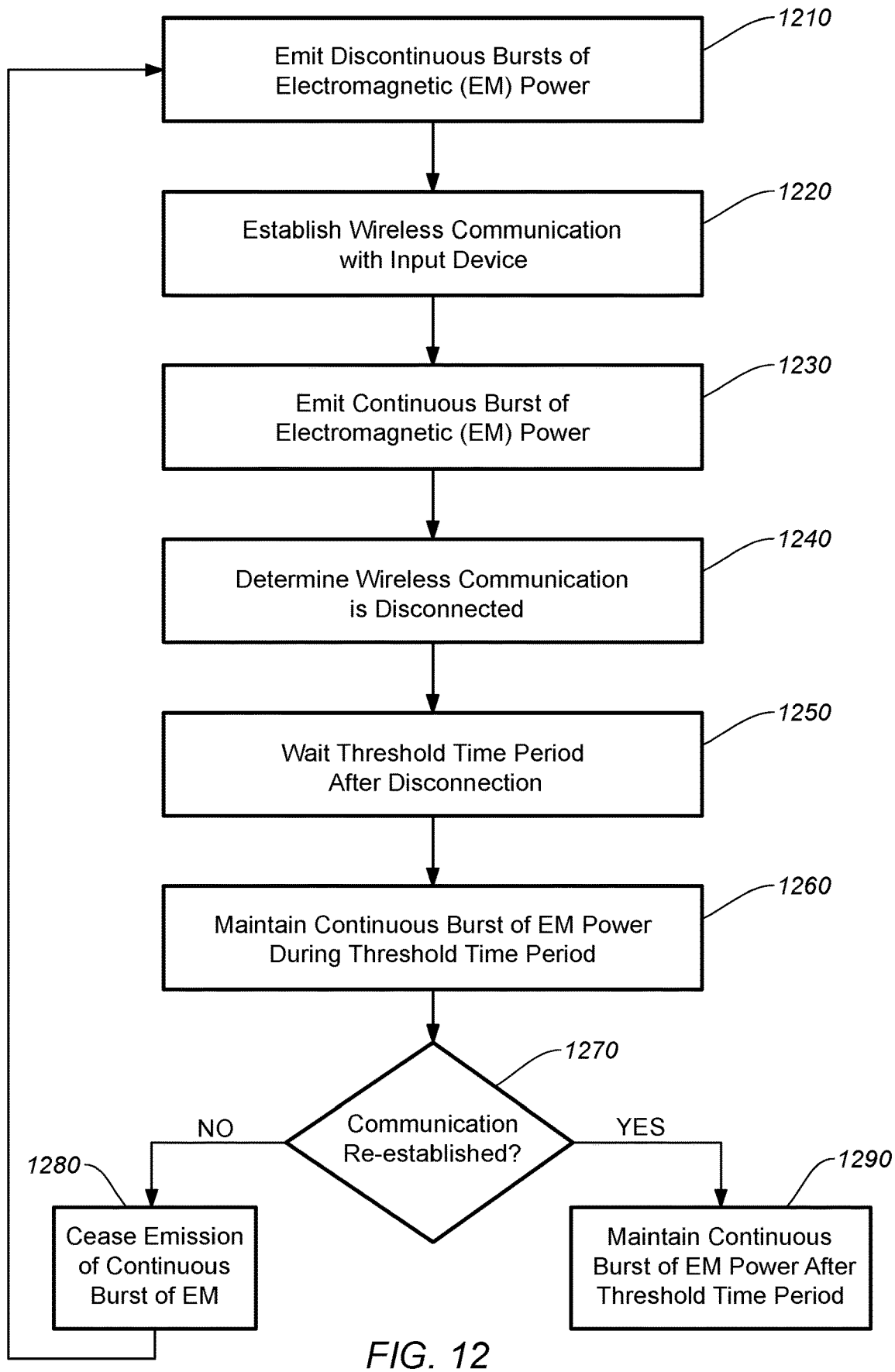
FIG. 12 is a flow chart showing a method of managing wireless charging between a base device and an input device, according to certain embodiments.

FIG. 12 is a flow chart showing a method 1200 of managing wireless charging between a base device and an input device, according to certain embodiments. Method 1200 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1200 can be performed by processor 515 of system 500, as shown and described above with respect to FIG. 5.

Figure 13:
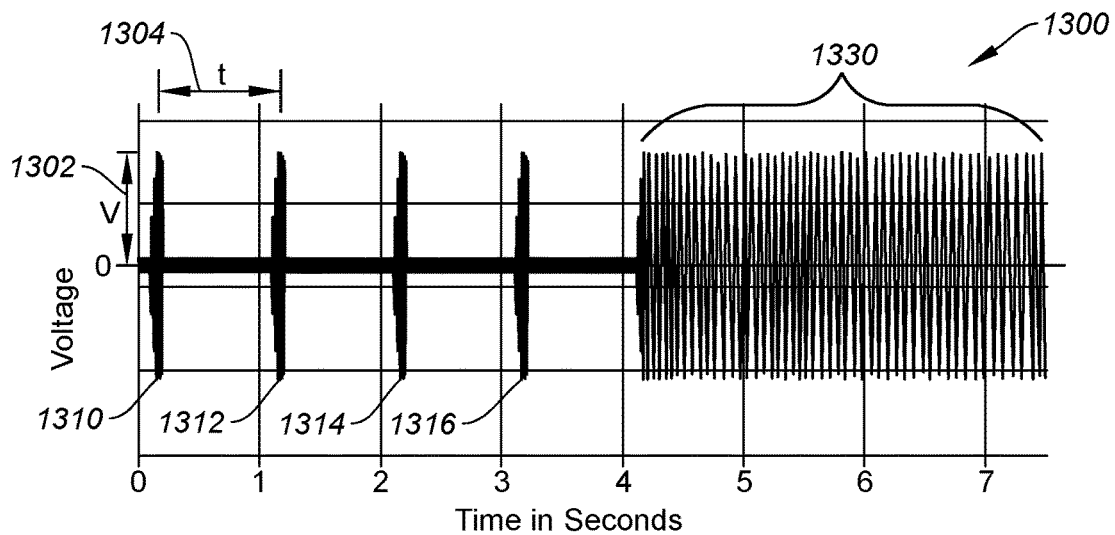
FIG. 13 shows a simplified diagram showing discovery and charging modes for a base device, according to certain embodiments.
Figure 14:
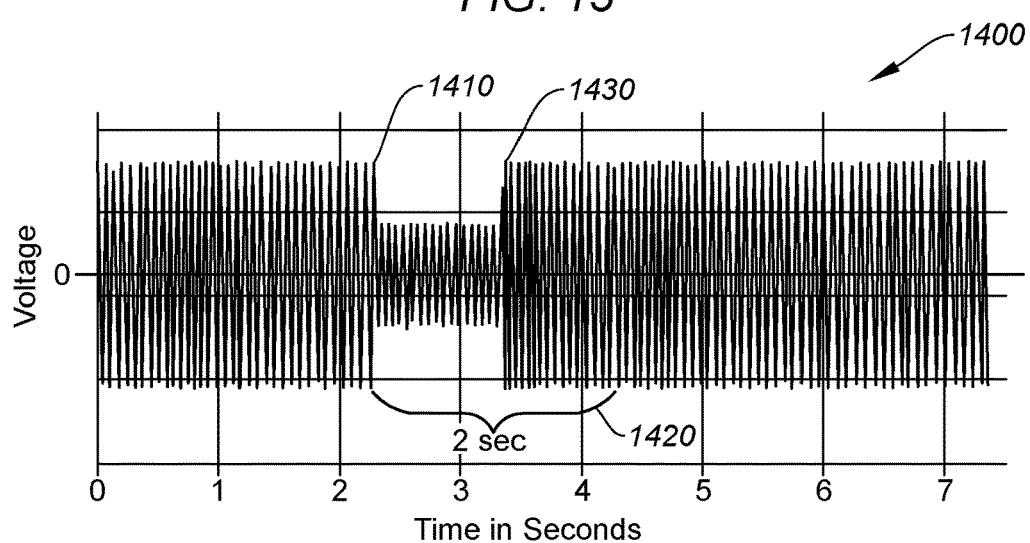
FIG. 14 shows a simplified diagram showing various charging modes for a base device, according to certain embodiments.

At step 1210, method 1200 can include wirelessly emitting, by the base device to the input device, one or more discontinuous bursts of EM power to wake a communications circuit in the input device and cause the input device to establish a wireless communication connection with the base device prior to the base device emitting the continuous burst of EM power, according to certain embodiments, and as shown in FIG. 13. The discontinuous burst may be emitted with any suitable pulse width, frequency, or amplitude, as would be understood by one of ordinary skill in the art. The pre-communication discontinuous EM bursts can help improve power efficiency by generally only emitting continuous EM bursts (e.g., as shown in FIG. 14) when an input device is detected and in communication with the corresponding base device. As indicated above, the discontinuous burst from the base device can cause the input device and/or modular insert to power up and establish communication with the base device. Communication can be established using any suitable communication protocol (e.g., Bluetooth®, BLE, ZigBee, etc.), and preferably a low power, short range variety.

At step 1220, method 1200 can include establishing, by a base device with the input device (or vice versa), a wireless communication connection for bi-directional wireless communication between the base device and the input device, according to certain embodiments. The wireless communication connection allows the input device (and/or modular insert) to communication with the base device to indicate that it is present and available to wirelessly receive EM power, as discussed above. In some cases, the range of the wireless communication connection (e.g., Bluetooth® variety) may be very short range and limited to an area at or near a surface of the base device, which can help power efficiency—it may be advantageous for the base device to emit EM power when the input device is known to be on or near the surface of the base device.

Although the embodiments described herein generally have separate circuits to handle EM power emission and wireless communication, some embodiments may combine them. For instance, EM power emission can be encoded via amplitude, frequency, and/or pulse-width modulation to communicate from base device to input device and/or modular insert. One of ordinary skill in the art with the benefit of this disclosure would understand the many variations, modifications, and alternative embodiments thereof.

At step 1230, method 1200 can include wirelessly emitting, by the base device, a continuous burst of electromagnetic (EM) power to charge the input device while the input device is on or near a surface of the base device. In some cases, the EM power emission may be any suitable strength, which can be adjusted based on the power supply. For example, base device may be powered by a host computer via a USB or FireWire cable. Such cables may have certain operational constraints (e.g., power limitations) that may be a factor in determining how much EM power the base device can emit. In some embodiments, operational constraints may not present limitations and the base device can emit EM power at any strength and at any range as needed. For instance, the base device may be powered by a wall outlet. Thus, the EM power range may be relatively short (e.g., within a portion of the surface of the base device—where normal movement of a mouse would be during use) or relatively long (e.g., within 1 foot of the surface of the base device—however, such embodiments may have lower power efficiency). One example of continuous EM power emission is shown in FIG. 14.

At step 1240, method 1200 can include determining, by the base device, that the wireless communication connection with the input device has been disconnected, according to certain embodiments. For example, when a user is "skating" the input device, as discussed above, the wireless communicative connection may be momentarily lost. Wireless communication can be lost due to many factors, in addition to "skating," such as lifting the input device, a momentary drop in communication due to EM interference, or any other cause of disconnection, as would be understood by one of ordinary skill in the art. Determining a disconnection can simply be the lack of a communicative channel being present or some other indication (e.g., another module determines the disconnection and informs the base device).

At step 1250, method 1200 can include waiting for a threshold time period after determining that the wireless communication connection has been disconnected, according to certain embodiments. The threshold time may be any suitable period of time that would include the time it would take for an input device in use to lose and subsequently reestablish wireless communication with the base station. For example, a user may lose wireless communication when performing a "skating" motion with a computer mouse on the base device. In some cases, the threshold time may be approximately 2 seconds. Shorter or longer times may be used, as would be understood by one of ordinary skill in the art.

At step 1260, method 1200 can include maintaining the continuous burst of EM power during the threshold time period. During the threshold time, it may not be known whether the user is still using the input device and the input device may have momentarily lost its wireless communicative connection with the base device, or if the user has removed the input device (or the input device is powered off). Thus, the continuous burst of EM power is maintained until after the threshold time to make that determination.

Figure 15:
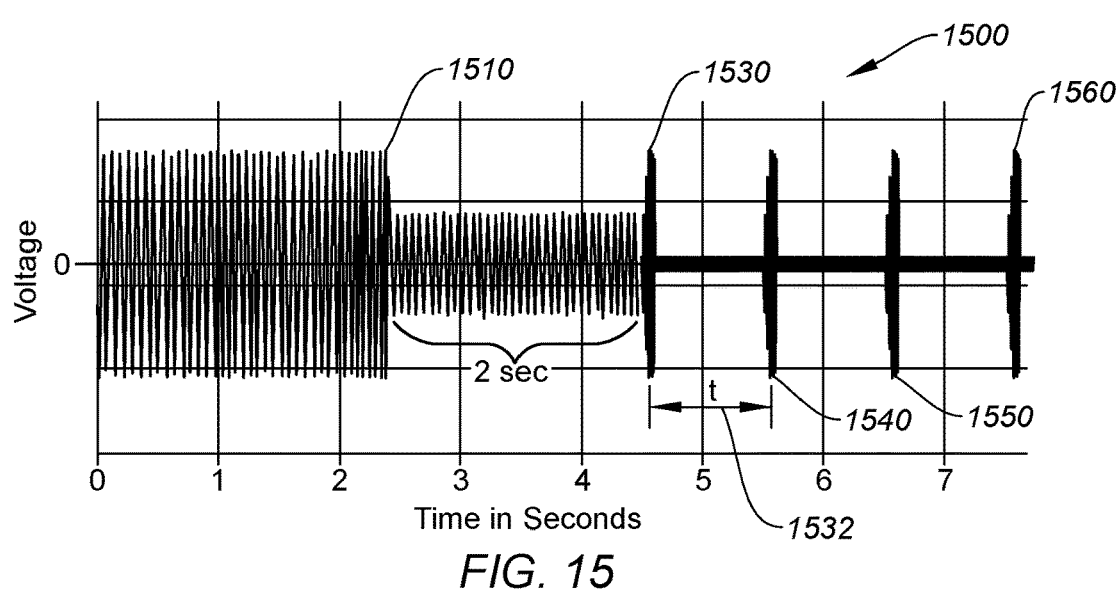
FIG. 15 shows a simplified diagram showing charging and shutdown modes for a base device, according to certain embodiments.

At step 1270, method 1200 can include determining, by the base device, whether wireless communication has been reestablished between the base device and input device, according to certain embodiments. If the wireless connection is reestablished within the threshold time period (e.g., 2 seconds), then the base device maintains the continuous burst of EM power after the threshold time period (step 1290). This may occur when the base device receives an indication that the wireless communication connection with the input device has been reestablished during the threshold time period (e.g., this is shown in FIG. 14). If the wireless connection between the input device and the base device is not reestablished within the threshold period of time, then the base device ceases emission of the continuous burst of EM power. This may occur when the base device does not receive an indication that the wireless communication connection has been reestablished by the end of the threshold time period (e.g., as shown in FIG. 15). In such cases, base device may then begin to emit discontinuous bursts of EM power (step 1210) or power down. One of ordinary skill in the art with the benefit of this disclosure would understand the many variations, modifications, and alternative embodiments thereof.

It should be appreciated that the specific steps illustrated in FIG. 12 provide a particular method 1200 for managing wireless charging between a base device and an input device, according to certain embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. For example, method 1200 can further include detecting, by the base device, a charge level of an energy storage device on the input device and modulating an amount of the continuous burst of EM power based on the charge level of the energy storage device. In some cases, modulating the amount of the continuous burst of EM power may include reducing or ceasing the emission of the continuous burst of EM power when the energy storage device is detected to be at or above charge threshold. One of ordinary skill in the art with the benefit of this disclosure would recognize and appreciate many variations, modifications, and alternatives of method 1200.

FIG. 13 shows a simplified graph 1300 showing discovery and charging modes for a base device, according to certain embodiments. Before the base device makes a communicative connection with the input device, the base device may send periodic bursts of EM power, which may cause communication circuitry (or comparable feature) to power on and/or establish a wireless communicative connection with the base station. The wireless connection can be an indication that the input device is local to the base station and ready to receive EM power.

Graph 1300 is presented as a voltage vs. time relationship and includes a series of discontinuous EM bursts (1310-1316) followed by a continuous EM burst over range 1330 generated by a base device. The periodic bursts can be any amplitude (e.g., 1-3 V peak-to-peak), frequency (e.g., 1 burst per second), or periodicity (e.g., regular intervals, irregular intervals), etc. The discontinuous burst period (e.g., including EM bursts 1310, 1312, 1314, 1316) may correspond to steps 1210 to 1220 of method 1200, according to certain embodiments. Shortly after the 4 second mark, the base device may receive an indication that a wireless connection with the input device has been established and begins to emit a continuous EM pulse over range 1330, as discussed above with respect to step 1230 of method 1200. As indicated above, different amounts of EM power can be emitted and discontinuous and continuous voltage and/or power levels do not need to be equal, as shown. For example, discontinuous EM bursts may be substantially lower in instantaneous power than the continuous EM pulses, as would be understood by one of ordinary skill in the art. The variation in discontinuous and continuous pulses described above can apply to all other embodiments explicitly and/or inherent discussed herein. It should also be noted that although graphs 1300-1500 show a particular 7-8 second interval, it is meant to provide one example of how EM power emission may operate in certain embodiments, and those of ordinary skill in the art with the benefit of this disclosure would understand that different power levels, voltage levels, frequencies, threshold time periods, EM burst characteristics, etc., are possible.

FIG. 14 shows a simplified diagram showing various charging modes for a base device, according to certain embodiments. After the base station determines that the wireless communication with the input device has been disconnected, the base device may wait for a short period of time to see if the connection is reestablished. This may be useful when a user moves an input device along a surface of the base device in a way that routinely causes a momentarily loss of wireless communicative connectivity, due to "skating" or other cause (e.g., EM interference from outside sources, power fluctuations in the base device or input device, or any suitable cause of momentary disconnection). In such instances, it can be more efficient to maintain EM power emission so that the input device does not stop charging when the communicative connection is lost. Otherwise, frequent fluctuations in EM power emission may cause the input device to charge more slowly, reduce overall power transfer efficiency, and may cause both the input device and base device to expend more power in the process.

Graph 1400 is presented as a voltage vs. time relationship and includes a first continuous EM burst 1410 over the first 2.2 seconds, which then reduces in amplitude from about 2.2 seconds to about 3.3 seconds, followed by a second continuous EM burst 1430 that remains through to the 7 second point and beyond. The reduction in amplitude for the first continuous EM burst 1410 occurs at the beginning of the 2 second interval 1420 where the base device determines that the communicative connection with the input device has been dropped. Although the power appears to reduce during the period where the wireless connection has been dropped, some embodiments may not reduce EM power emission, or may increase power emission. Before the end of the threshold time period (e.g., 2 seconds), the wireless communicative connection is reestablished and the continuous EM burst 1430 is maintained. Although the continuous bursts are described and depicted as two (or three) separate bursts, it should be understood that the EM burst is continuous from 0-7 seconds (or any range) and does not include any discontinuous portions there between. Graph 1400 can correspond to steps 1240-1270 and 1290 of method 1200 (e.g., see FIG. 12).

FIG. 15 shows a simplified diagram showing charging and shutdown modes for a base device, according to certain embodiments. As indicated above, after the base station determines that the wireless communication with the input device has been disconnected, the base device may wait for a short period of time to see if the connection is reestablished.

Graph 1500 is presented as a voltage vs. time relationship and includes a first continuous EM burst 1510 over the first 2.4 seconds, which then reduces in amplitude from about 2.4 seconds to about 5.4 seconds, followed by a series of discontinuous EM bursts 1530, 1540, 1550, 1560 at interval t (1532), similar to the discontinuous EM pulses of FIG. 13. The reduction in amplitude for the first continuous EM burst 1510 occurs at the beginning of the 2 second threshold timer period where the base device determines that the communicative connection with the input device has been dropped. Although the power appears to reduce during the period where the wireless connection has been dropped, some embodiments may not reduce EM power emission, or may increase power emission. During the threshold time period (e.g., 2 seconds), the wireless communicative connection has not been reestablished and the continuous EM burst changes back to discontinuous EM bursts 1530-1560, similar to discontinuous EM bursts 1310-1316 of FIG. 14. Under these conditions, it is assumed that the input device is no longer within range (or is shut off), and the base device reverts back to discovery mode. Graph 1500 can correspond to steps 1240-1280 and 1210 of method 1200 (e.g., see FIG. 12).

Many of the embodiments described herein include the control of EM power emission by the base device based on the presence of a wireless communicative connection (e.g., BLE) between the base device and the input device. As indicated above, the input device can be referred to as a "host" device because it can "host" or house a modular insert (see, e.g., FIGS. 2-3). When the BLE connection is present, then the base device emits EM power from its corresponding coil(s). When the BLE connection is lost, the base device continues to emit EM power for a threshold period of time. If, during that time, the input device reestablishes the BLE connection, then EM power emission continues. If the input device fails to reestablish the BLE connection by the end of the threshold period of time, then EM power emission may cease.

In certain embodiments, control of EM power emission can be dependent on whether the input device is receiving (e.g., via its coil(s)) EM power from the base device. For example, when input device 560 (e.g., with modular insert 530) receives EM power from base device 510, a processor (e.g., one or both of processors 550, 590) can generate a signal or message indicating that EM power is being received, which can then be sent to base device 510 via the communicative connection (e.g., BLE—via antenna 557 or 585). Base device 510 can then maintain EM power emission. When input device 560 (and modular insert 530) loses EM power coupling (e.g., due to skating or moving the mouse outside the EM range of coil 520—on and/or above the surface of base device 510), a processor can generate a signal or message indicating that EM coupling is lost, which can then be sent to base device 510. Base device 510 can continue to emit EM power for a threshold period of time (e.g., 2 seconds). If, during that time, the input device reports that EM power coupling is restored (e.g., the input device is receiving EM power again), then base device continues to emit EM power as before. If the input device fails to reestablish EM power coupling, then a signal or message is sent to the base device indicating that EM power coupling has not returned (within the threshold period of time), and EM power emission by base device 510 may cease. One of ordinary skill in the art would understand the many variations, modifications, and alternative embodiments thereof.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a computer input device including:
   a first housing including a bottom surface, the first housing defining an opening configured to provide access to a cavity within the computer input device, wherein the cavity is configured to receive a removable modular insert including a receiving coil; and
   a sensor coupled to the first housing, the sensor configured to be powered via power wirelessly received by the receiving coil;
   a base device including:
   a second housing including a top surface; and
   a transmitting coil coupled to the second housing, the transmitting coil configured to provide wireless power to the receiving coil; and
   wherein:
   the sensor is configured to detect relative changes in position between the computer input device and the base device as the bottom surface of the computer input device passes across the top surface of the base device;
   the cavity is configured to receive the removable modular insert in an orientation such that the receiving coil aligns with the transmitting coil for wireless power transfer from the base device when the bottom surface of the computer input device is placed on the top surface of the base device; and
   the removable modular insert includes a wireless transceiver configured to be powered via power wirelessly received by the receiving coil and transmit data corresponding to the relative changes in position between the computer input device and the base device.

2. The system of claim 1, wherein the receiving coil and the transmitting coil are configured for inductive power transfer between the coils.

3. The system of claim 2, wherein the receiving coil, when mechanically secured within the cavity, is substantially parallel to the bottom surface of the computer input device.

4. The system of claim 1, wherein the top surface of the base device is substantially planar.

5. The system of claim 1, wherein the removable modular insert is magnetically coupled to the computer input device.

6. The system of claim 1, wherein the removable modular insert includes a local energy storage device and wherein:
   the local energy storage device is configured to be charged via power received via the receiving coil; and
   the sensor is configured to be powered by the local energy storage device.

7. A computer input device, comprising:
   a housing including a bottom surface, the housing defining an opening configured to provide access to a cavity within the computer input device, wherein the cavity is configured to receive a removable modular insert including a receiving coil;
   a sensor configured to be powered via power wirelessly received by the receiving coil; and wherein:
   the sensor is configured to detect relative changes in position between the computer input device and an underlying surface as the computer input device passes across the underlying surface;
   the cavity is configured to receive the removable modular insert in an orientation such that the receiving coil aligns with a transmitting coil for wireless power transfer from a base device including the underlying surface when the bottom surface of the computer input device is placed on the underlying surface; and
   the removable modular insert includes a wireless transceiver configured to be powered via power wirelessly received by the receiving coil and transmit data corresponding to the relative changes in position between the computer input device and the base device.

8. The computer input device of claim 7, wherein the receiving coil is configured to receive power via inductive power transfer.

9. The computer input device of claim 8, wherein the receiving coil, when mechanically secured within the cavity, is substantially parallel to the bottom surface of the computer input device.

10. The computer input device of claim 9, wherein the bottom surface of the computer input device is substantially planar.

11. The computer input device of claim 7, wherein the removable modular insert is magnetically coupled to the computer input device.

12. A method of operating a computer input device, comprising:
    physically coupling a removable modular insert at least partially within a cavity of the computer input device wherein the cavity is configured to receive the removable modular insert in an orientation such that a receiving coil of the removable modular insert aligns with a transmitting coil for wireless power transfer from a base device when the computer input device is placed on the base device;
    detecting, using a sensor of the computer input device, relative changes in position between the computer input device and the base device as the computer input device passes across the base device;
    wherein the sensor is powered via power wirelessly received by the receiving coil from the base device; and
    wherein the removable modular insert includes a wireless transceiver configured to be powered via power wirelessly received by the receiving coil and transmit data corresponding to the relative changes in position between the computer input device and the base device.

13. The method of operating a computer input device of claim 12, wherein the receiving coil is configured to receive power via inductive power transfer.

14. The method of operating a computer input device of claim 13, wherein the receiving coil, when mechanically secured within the cavity, is substantially parallel to a bottom surface of the computer input device.

15. The method of operating a computer input device of claim 14, wherein the bottom surface of the computer input device is substantially planar.

16. The method of operating a computer input device of claim 12, wherein the removable modular insert is magnetically coupled to the computer input device.

* * * * *